(No Model.)

R. T. HENDRICKSON.
HANDLE ATTACHMENT FOR PLANES.

No. 337,581. Patented Mar. 9, 1886.

Witnesses
H. D. Williams
Edwin S. Coy

Robert T. Hendrickson
Inventor
per
Alfred Shedlock
Atty.

UNITED STATES PATENT OFFICE.

ROBERT T. HENDRICKSON, OF BROOKLYN, NEW YORK.

HANDLE ATTACHMENT FOR PLANES.

SPECIFICATION forming part of Letters Patent No. 337,581, dated March 9, 1886.

Application filed October 1, 1885. Serial No. 178,684. (No model.)

*To all whom it may concern:*

Be it known that I, ROBERT T. HENDRICKSON, a citizen of the United States, residing at Brooklyn, county of Kings, State of New York, have invented a certain new and Improved Handle Attachment for Wood-Planes, of which the following is a specification.

The operation of planing floors, &c., by means of the ordinary hand-plane is both tedious and trying to the workman, by reason of the awkward and unnatural positions he is compelled to assume in performing this work, which is probably the hardest of all manual labors.

Now, this invention has for its object to facilitate the labor of planing floors, &c., and to provide a means by which said work may be done without obliging the operator to assume other than a natural standing position; and it consists of a handle pivoted to a frame-piece adapted to be attached to any ordinary wood-plane, said handle being sufficiently long to be grasped by the operator while standing, when the plane is resting on the floor, leaving him free to exercise the whole of his strength in a natural manner in pushing the plane over the floor, thus enabling much more work to be accomplished in a given time and with less exertion than can now be done by using the plane in the ordinary manner.

Figure 1:
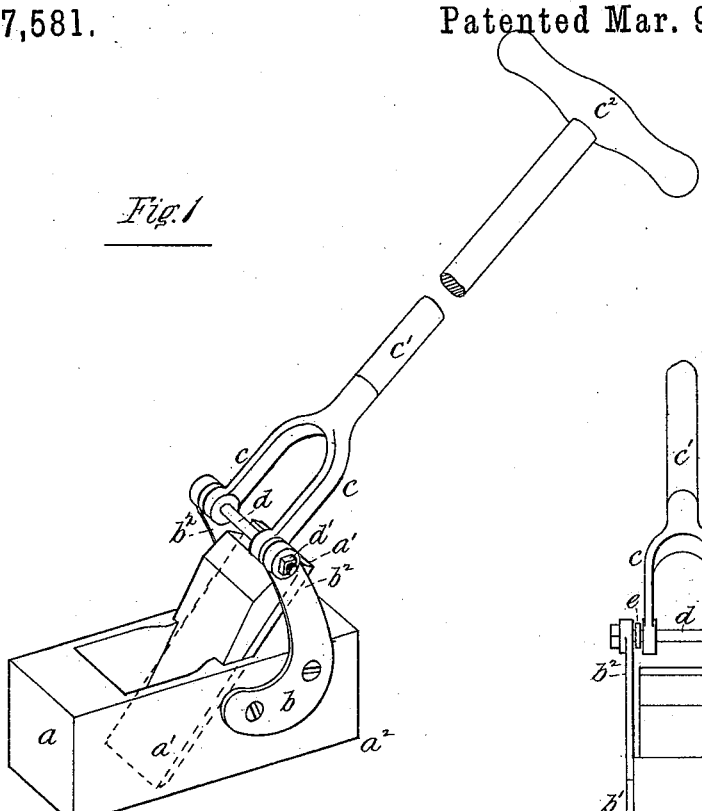
Figure 2:
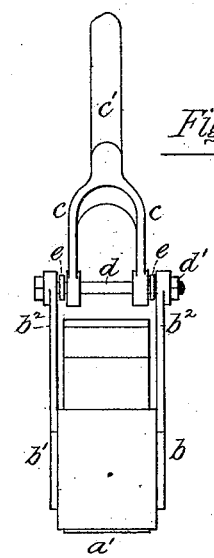
Figure 3:
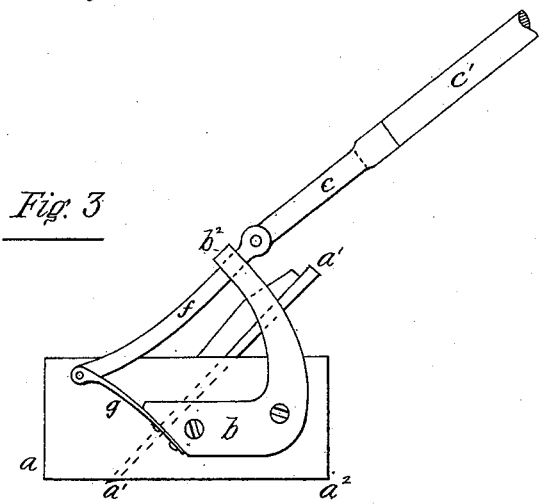

In the accompanying drawings, forming part of this specification, Figure 1 is a perspective view of a hand-plane with my improved handle attachment applied thereto. Fig. 2 is an end view of the same, and Fig. 3 is a side view of a modification in the construction.

The wood-plane $a$ is of the ordinary construction, and my improved handle attachment is composed of two side frames, $b\ b'$, secured by screws to the side of the plane and having upwardly-projecting ears or lugs $b^2\ b^2$, between which the handle is pivoted. The side frames, $b\ b'$, are so formed that the pivotal centers of the handle are above the top of the plane and vertically situated between the cutting-edge of the plane-iron $a'$ and the heel $a^2$ of the plane.

The handle comprises a bifurcated piece, $c$, having a socket, the shaft $c'$, secured in said socket, and the cross hand-piece $c^2$, secured on the upper end of the shaft $c'$. The bifurcated piece $c$ is connected to the ears $b^2\ b^2$ of the side frames, $b\ b'$, by the bolt $d$, which passes through them and is held in place by the nut $d'$.

The handle-shaft $c'$ is sufficiently long to allow the operator to use the plane while standing by pushing it forward on the floor, thus placing him in the most convenient and easy position to apply his strength economically and without undue fatigue to accomplish work which now calls for extra exertion, as the manual planing of floors by means of the common hand plane in the ordinary manner is one of the most arduous duties performed by mechanics.

The cross hand-piece $c^2$ is preferably made sufficiently long to be conveniently grasped by both hands, the pressure being applied in a downward forward direction, and, by reason of the position of the pivoted connection in the ears $b^2\ b^2$ relatively to the working-face of the plane, the operator has perfect control over the plane and can divide the pressing force between the cutting-edge and the heel of the plane, as desired, by varying the angle at which the handle is held, and as the upper end of the handle has to be moved a considerable distance relatively to the plane to cause slight variations in the position of the center of pressure between the cutting-edge and the heel, the right amount of force to cause the plane-iron to grip and to drive the plane forward can be applied by the operator to a nicety.

This handle attachment can be applied to planes of different widths by placing washers $e\ e$ between the bifurcated piece $c$ and ears $b^2\ b^2$, so as to bring the handle central with the plane, as shown at Fig. 2.

In applying this attachment to planes for use on hard woods it may be advantageous to connect the pivoted handle so as to yield slightly against the pressure, instead of connecting it rigidly to the plane. This may be done by making the upwardly-projecting ears $b^2\ b^2$ sufficiently light to act as springs; or the construction shown in Fig. 3 may be adopted, in which the piece $c$ of the handle is pivoted at each side to the end of a bar, $f$, which is connected at its other end to a spring, $g$, secured to the side frame, the upper end of the bar $f$ being held in an opening formed through the ear $b^2$.

It will be readily seen that planes, by the employment of this handle attachment, may be easily used in places which cannot be reached by the plane alone.

Having now described my invention, what I claim, and desire to secure by Letters Patent, is—

1. As an article of manufacture, a handle attachment for wood-planes, composed of a frame having upwardly-projecting ears and adapted to be rigidly attached to the body of the plane, and a handle pivoted to the projecting ears, which are above the top of the plane and vertically situated between the cutting-edge and heel of the plane, substantially as and for the purpose set forth.

2. In a handle attachment for wood-planes, in combination, the side frames, $b\ b'$, rigidly secured to the body $a$ of the plane, having upwardly-projecting ears $b^2\ b^2$, extending above the plane and vertically situated between the cutting-edge and heel of the plane, the handle composed of the bifurcated piece $c$, shaft $c'$, and hand-piece $c^2$, and the connecting-bolt and nut $d\ d'$, by which the handle is pivoted to the ears $b^2\ b^2$, substantially as set forth.

In testimony whereof I have hereunto set my hand, at New York, county and State of New York, this 26th day of September, 1885.

ROBT. T. HENDRICKSON.

Witnesses:
H. D. WILLIAMS,
ALFRED SHEDLOCK.